United States Patent

Heagler

[15] 3,663,149
[45] May 16, 1972

[54] METHOD AND APPARATUS FOR REMOVING A LAYER OF COMBUSTIBLE LIQUID FROM THE SURFACE OF A BODY OF WATER

[72] Inventor: Richard B. Heagler, Salem Tsp., Westmoreland Co., Pa.

[73] Assignee: Pittsburgh Corning Corporation, Pittsburgh, Pa.

[22] Filed: Nov. 16, 1970

[21] Appl. No.: 89,617

[52] U.S. Cl. .................................. 431/2, 114/0.5 R, 431/7
[51] Int. Cl. ......................................................... F23q 13/00
[58] Field of Search .................... 431/2, 4, 7, 170, 298, 326, 431/331, 356; 210/242; 114/0.5 R

[56] References Cited

UNITED STATES PATENTS 3,556,698  1/1971  Tully.............................................431/2
3,589,844  6/1971  Kraemer...................................431/2 X Primary Examiner—Frederick L. Matteson
Assistant Examiner—W. C. Anderson
Attorney—Stanley J. Price, Jr.

[57] ABSTRACT

A generally U-shaped, buoyant, self-propelled vessel floats partially submerged in a body of water and has a longitudinal channel portion with a front opening. The vessel has an open bottom portion beneath the longitudinal channel portion. As the vessel advances into a body of water, a band of water with the layer of combustible liquid floating thereon, enters the channel portion of the vessel. The rate at which the combustible liquid, as a layer, enters the channel portion of the vessel is dependent on the forward speed of the vessel and the speed is controlled so that substantially all of the layer of combustible liquid is removed by burning before the band of water psses under the rear portion of the vessel. As the vessel advances, the band of water with the layer of combustible liquid moves through a mixing chamber within the channel portion where a monolayer of cellular ceramic nodules are positioned on the top surface of the layer of combustible liquid. The layer of combustible liquid with the nodules floating thereon, moves rearwardly with the forward advance of the vessel into a combustion chamber where the layer of combustible liquid is ignited and burned. The nodules within the combustion chamber are recycled to the mixing chamber where they are again positioned as a monolayer on the upper surface of the layer of combustible liquid. Combustion air is provided for the combustion chamber and the combustion gases may be subjected to a secondary burning in the stack to remove the combustible materials in the combustion gases and provide a substantially smoke-free waste gas. Apparatus is provided to seal the combustion chamber and mixing chamber if the burning of the combustible liquid tends to spread beyond the receiver.

10 Claims, 3 Drawing Figures

PATENTED MAY 16 1972

3,663,149

INVENTOR.
Richard B. Heagler
BY Stanley J Price
HIS ATTORNEY.

3,663,149

METHOD AND APPARATUS FOR REMOVING A LAYER OF COMBUSTIBLE LIQUID FROM THE SURFACE OF A BODY OF WATER

BACKGROUND OF THE INVENTION

1. Field of the Invention

This invention relates to a method and apparatus for removing a layer of combustible liquid from the surface of a body of water and more particularly to a method and apparatus for continuously burning a preselected portion of a layer of combustible liquids on the surface of a body of water.

2. Description of the Prior Art

In the past, attempts have been made to confine and collect the layer of combustible liquid formed by oil spills and the like. It has been suggested to provide booms to encircle the spill and then to collect the layer of oil on the water's surface by means of absorbent material or skimming devices. The boom structures have difficulty in encircling the entire layer of combustible liquid and frequently, portions of the layer pass over and under the booms.

Skimmer vessels, as described in U.S. Pat. Nos. 2,867,903; 3,219,190; and 3,529,729 are suggested to remove the oil from the surface of the water by a mechanical means and to collect the oil in collector vessels. It has been found, however, that the layer of oil is relatively thin as compared with the body of water on which it is floating and an inordinate amount of water must be removed with the oil. The water removed is contaminated with the oil and must also be collected in the collector vessel and disposed of with the oil to prevent further contamination.

United States pending patent applications, Ser. Nos. 829,746; 38,868; 38,865; and 38,866, assigned to the assignee of this invention, are directed to processes for positioning a monolayer of cellular ceramic nodules on the surface of a layer of combustible liquid and completely burning the layer of combustible liquid therebeneath. These processes provided the only method known to Applicant for successfully burning substantially all of the layer of combustible liquid beneath the nodules. The processes described in the above-mentioned pending applications do not confine the burning to selected areas and the body of water with the layer of combustible liquid thereon is subject to the prevailing wind and wave action.

SUMMARY OF THE INVENTION

The present invention relates to a method and apparatus for effectively removing a layer of combustible liquid floating on a body of water by channeling a band of the layer of combustible liquid into an open channel portion of a vessel and burning the layer of combustible liquid while floating on the body of water within the confines of the vessel. As the vessel advances, a portion of the layer of combustible liquid enters the channel portion of the vessel through a front opening within the confines of the vessel. A layer of cellular ceramic nodules is positioned on the layer of combustible liquid. The layer of combustible liquid with the nodules positioned thereon is removed rearwardly in the vessel channel portion by the forward advance of the vessel into a combustion chamber where the layer of combustible liquid with the layer of nodules thereon is ignited and burned. After combustion is substantially complete, the nodules are removed from the body of water and recycled to the front portion of the longitudinal channel portion where they are again repositioned on another portion of the layer of combustible liquid. Suitable means are provided to recycle the cellular ceramic nodules, provide combustion air for the combustion chamber, burn the combustible material in the combustion gases and confine the combustion of the layer of combustible liquid to the combustion chamber within the receiver on the vessel.

DESCRIPTION OF THE PREFERRED EMBODIMENT

Throughout the specification, the term "cellular ceramic nodules with an outer treated surface" is intended to designated nodules prepared in accordance with the process described in U.S. Pat. No. 3,354,024, from a pulverulent, glassy material and a cellulating agent or from other pulverulent materials as described in U.S. Pat. No. 3,441,396. A description of the process for treating the nodule surface by providing a textured surface may be found in U.S. Pat. No. 3,493,218. The cellular ceramic nodules enhance the combustion of the combustible liquid floating on the surface of the body of water in accordance with the process described in copending U.S. patent application Ser. No. 829,746 and copending United States patent application Ser. No. 38,868. Other processes to improve the combustion enhancing properties of cellular glass nodules are described in copending U.S. patent applications Ser. No. 38,866 and Ser. No. 38,865.

The cellular ceramic nodules preferably have an apparent density of between about 6 and 30 pounds per cubic foot and a thermal conductivity of between about 0.40 and 0.50 Btu/hr./sq.ft./° F./in. at 75° F. For use as a combustion enhancing material, it is preferred that the nodules have a size of between about one-eighth and one-half inch with an apparent density of between about 10 and 20 pounds per cubic foot.

Figure 1:
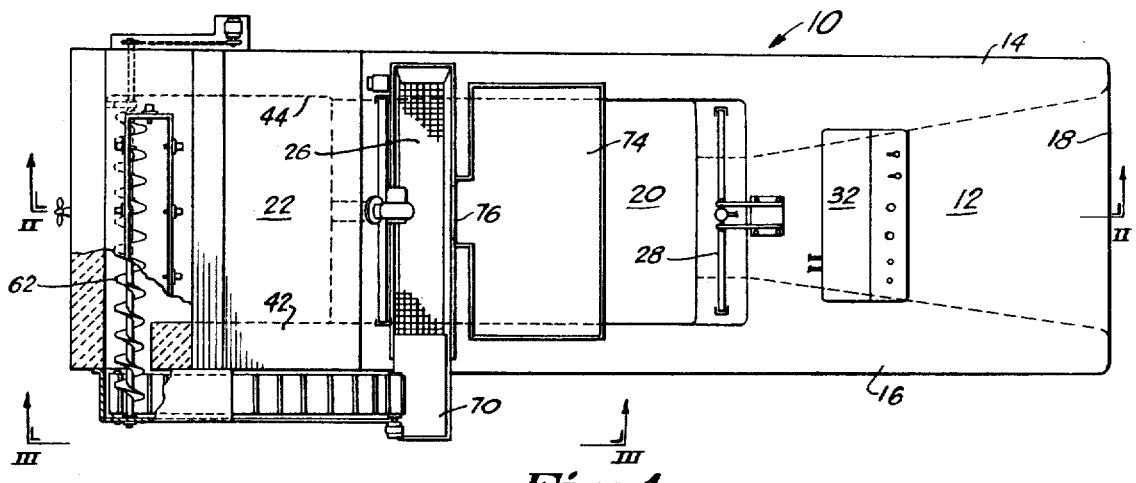
FIG. 1 is a top plan view of the vessel having a central channel portion with a front opening, a mixing chamber and a combustion chamber.
Figure 2:
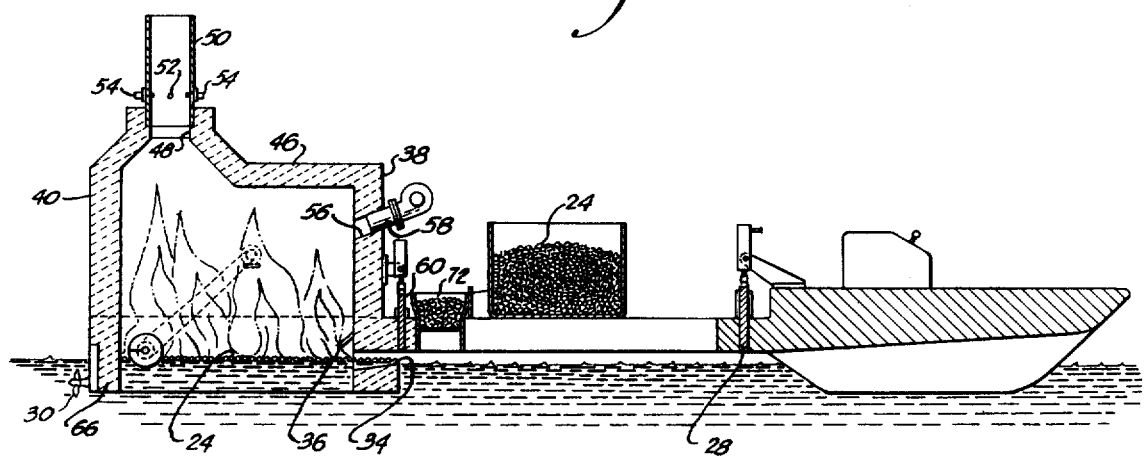
FIG. 2 is a view in section and elevation taken along the lines II—II of FIG. 1 illustrating the layer of combustible liquid floating on the surface of the water and moving rearwardly through the central channel portion, into the mixing chamber and into the combustion chamber.
Figure 3:
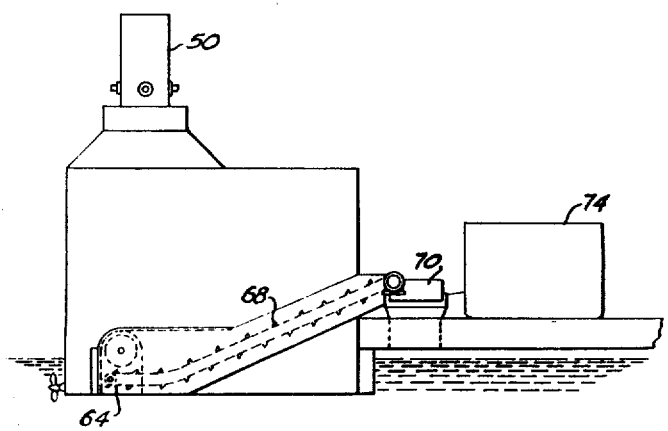
FIG. 3 is a schematic view, in elevation, of the recycling apparatus for the cellular ceramic nodules positioned along the side of the vessel.

Referring to the drawings, and particularly to FIGS. 1 and 2, there is illustrated a vessel 10 having a generally U-shaped configuration with a central longitudinal channel portion 12. The vessel 10 preferably has a pair of buoyant side portions 14 and 16 with an open bottom portion below the channel portion 12 to provide an area within the vessel 10 that confines a layer of combustible liquid floating on the surface of the body of water. The channel portion 12 has a front opening 18 which permits the entry of the layer of combustible liquid floating on the surface of the water into the channel portion 12. The channel portion 12 may be described as having a mixing chamber 20 and a rear combustion chamber 22. The mixing chamber 20 is located in front of the combustion chamber 22 so that the layer of combustible material may be prepared for burning before it enters the combustion chamber 22. The vessel 10, particularly the side portions 14 and 16 and the enclosure for the combustion chamber 22 is preferably fabricated from a light material to permit the vessel to float on the body of water without displacing the later and layer of combustible liquid within the central channel portion 12. The vessel 10 may be fabricated from an admixture of cellular ceramic nodules and Portland cement in a ratio of about five parts by weight of cellular ceramic nodules to one part by weight of Portland cement. Other materials having sufficient buoyancy may also be employed.

When floating in a body of water, the vessel 10 is partially submerged as illustrated in FIG. 2 so that a band of the layer of combustible liquid floating on the top surface of the body of water will enter the front opening 18 and move rearwardly through the channel portion 12 as the vessel advances in the body of water. The layer of combustible liquid moves rearwardly into the mixing chamber 20 within the confines of the vessel 10 and within the mixing chamber 20. A layer of cellular ceramic nodules 24 is positioned on the top surface of the layer. The cellular ceramic nodules are distributed onto the upper surface of the combustible liquid within the mixing chamber 20 by means of a distributor device 26, such as, for example, a vibrating screen.

A gate member 28 extends along the front portion of the mixing chamber 20 and is arranged to close the channel portion 12 and isolate the mixing chamber 20 from the forward portion of the channel portion 12. The gate 28 is arranged to prevent the combustion of the layer of combustible liquid from spreading into the forward portion of the channel 12 and possibly to the layer of combustible liquid beyond the confines of the vessel 10. Propelling means 30 are provided for the vessel 10 and are preferably arranged adjacent the rear portion of the vessel 10 to maintain the layer of combustible liquid within the channel portion 12 in a quiescent state as the layer moves rearwardly within the channel portion 12. Suitable controls 32 are provided for the propelling means 30 and the other apparatus for recycling and distributing the cellular ceramic nodules 24.

The layer of combustible liquid within the mixing chamber 20 having the layer of cellular ceramic nodules 24 positioned thereon, moves rearwardly in the mixing chamber 20 and through an opening 34 into the rear combustion chamber 22. Suitable igniting means 36 are provided within the rear combustion chamber 22 to ignite the layer of combustible liquid with the cellular ceramic nodules 24 positioned thereon.

The rear combustion chamber 22 is preferably enclosed with a front vertical wall 38, a rear vertical wall 40, a pair of spaced vertical side walls 42 and 44, and a top wall or roof 46. With this arrangement, an enclosure is provided for the rear combustion chamber 22 that has a bottom opening which permits the layer of combustible liquid floating on the surface of the body of water to be moved into the enclosure as a layer floating on the body of water and burned while remaining as a layer on the surface of the body of water.

The roof 46 has a stack opening 48 in which a preferably metallic stack 50 is positioned. The metallic stack 50 has a plurality of radial openings 52 arranged to receive burner outlets 54. Although not illustrated, the burner outlets are attached to a suitable source of combustion gas and may be utilized to ignite and burn the combustible material in the combustion gas and provide a relatively smoke-free gaseous product of combustion.

The combustion chamber front wall 38 has an opening 56 in which a blower 58 is positioned to supply combustion air to the rear combustion chamber 22. It should be understood that other suitable means may be provided to supply combustion air to the combustion chamber and maintain combustion of the layer of combustible liquid within the combustion chamber 22. A gate 60 is provided to close the opening 34 into the rear combustion chamber in the front wall 38 to again prevent the spread of the combustion of the layer of combustible liquid beyond the confines of the vessel 10. It should be understood that the gates 28 and 60 are safety devices and remain in a normally open position since the layer of combustible liquid without the layer of cellular ceramic nodules thereon, is difficult to ignite and it is seldom that the layer of combustible liquid will sustain ignition.

The layer of cellular ceramic nodules on the surface of the body of water, because of the forward motion of the vessel 10, tend to collect against the base of the combustion chamber rear wall 40. A suitable conveying means such as the screw conveyor 62 moves the layer of cellular ceramic nodules adjacent to the rear wall 40 transversely into an enclosed receiver 64 that is positioned outside of the rear combustion chamber 22. It should be noted that the combustion chamber rear wall 40 has a bottom end 66 beneath the top surface of the water so that the nodules which float on the surface of the water remain within the rear combustion chamber 22 and only the water previously present within the confines of the rear combustion chamber 22 is displaced beneath the combustion chamber rear wall 40.

The nodules 24 conveyed transversely by the screw conveyor 62 are disposed in a receiver 64 in which there is positioned a rib-type conveyor 68. The conveyor 68 conveys the nodules upwardly onto a vibrating feeder 70 that conveys the nodules transversely into a hopper 72 positioned above the mixing chamber 20. The hopper 72 has a vibrating screen base portion 26 that feeds the nodules onto the surface of the combustible liquid within the mixing chamber 20. A suitable storage bin 74 has an outlet 76 that supplies makeup nodules to the hopper 72.

It should be understood that the size of the vessel may be varied to permit the complete combustion of the layer of combustible liquid material within the channel 12 while the vessel 10 moves through the body of water at a relatively fast speed. The relative position of the distributor device 26 within the channel portion 12 may also be advanced forwardly within the channel portion 12 to permit the layer of cellular ceramic nodules 24 to be positioned on the layer of combustible liquid within the channel 12 and provide sufficient residence time of the nodules 24 on the surface of the combustible liquid for the combustible liquid to move upwardly on the nodules 24. Also, to ensure complete combustion of the layer of combustible liquid within the combustion chamber 22, the combustion chamber may also be elongated to permit a longer residence time within the chamber for burning before the nodules are removed therefrom by the screw conveyor 62.

OPERATION

The vessel 10 floats on the body of water and is propelled into the portion of the body of water that has the layer of combustible liquid floating thereon. A band of the layer of combustible liquid enters through the front opening 18 into the vessel channel portion 12 and moves rearwardly therein as the vessel 10 continues to move forwardly in the body of water.

In the mixing chamber 20 a layer of cellular ceramic nodules 24 is positioned on the upper surface of the layer of combustible liquid by means of the vibrating screen type distributor 26. The layer of combustible liquid floating on the body of water with the layer of cellular ceramic nodules floating thereon, thereafter moves into the combustion chamber 22 through the opening 34 in wall 38. Within the combustion chamber 22, the layer of combustible liquid with the nodules 24 thereon is ignited by means of igniter 36.

It should be understood, however, that it may be necessary to only ignite the first portion of the layer of combustible liquid with the nodules 24 thereon upon entering the combustion chamber 22. Combustion will continue and will continue to spread to other portions of the layer of combustible liquid with the cellular ceramic nodules 24 thereon as the combustible liquid enters the combustion chamber 22.

As the layer of combustible liquid with the cellular ceramic nodules 24 thereon moves rearwardly in the combustion chamber 22, because of the forward advance of vessel 10, the layer of combustible liquid is removed from the body of water by burning. The nodules adjacent the rear wall 40 of the combustion chamber 22 are removed from the surface of the body of water by means of the screw conveyor 62 and are deposited in the receiver 64. A conveyor 68 then conveys the nodules to a transverse vibrating conveyor or chute 70 where the nodules are again deposited in a hopper 72 for subsequent distribution on the layer of combustible liquid therebeneath.

Combustion air is supplied to the combustion chamber 22 by means of blower 58 and secondary burners 54 are positioned in the stack 50 to burn any of the combustible material remaining in the combustion gases. With this arrangement, relatively smoke-free gaseous products of combustion are emitted to the atmosphere.

With the above described method and apparatus, it is now possible to quickly, efficiently and substantially completely remove a layer of combustible liquid from a body of water. With the configuration illustrated, it may be necessary to make several parallel passes through the layer of combustible liquid floating on the body of water to burn substantially all of the combustible liquid in the oil spill.

It should be understood that the relative rate of combustion of the layer of combustible liquid to substantially complete combustion thereof is dependent on many factors, such as the type of combustible liquid, the thickness of the layer, and the viscosity of the liquid. In certain types of spills the vessel may advance the layer of combustible liquid relatively rapidly and combustion of the layer of combustible liquid will be complete before the water on which the layer had previously floated passes beneath the rear wall of the combustion chamber. With the self-propelled vessel 10, it is possible to regulate the speed at which the vessel passes through the layer of combustible liquid so that combustion of the layer of combustible liquid within the chamber is complete.

According to the provisions of the patent statutes, I have explained the principle, preferred construction and mode of operation of my invention and what is now considered to represent its best embodiment has been illustrated and described. However, it should be understood that, within the scope of the appended claims, the invention may be practiced otherwise than as specifically illustrated and described.

I claim:

1. Method for removing a layer of combustible liquid from the surface of a body of water comprising,
    advancing a buoyant vessel into a body of water having a layer of combustible liquid floating thereon,
    moving a band of said body of water with said layer of combustible liquid floating thereon into a longitudinal channel portion within said vessel,
    positioning a layer of cellular ceramic nodules on the surface of said layer of combustible liquid floating on said band of water within said channel portion,
    igniting said layer of combustible liquid with said layer of cellular ceramic nodules floating thereon within the confines of said vessel, and
    removing said layer of combustible liquid with said layer of nodules positioned thereon from said band of water by burning said layer of combustible liquid within said vessel.

2. A method for removing a layer of combustible liquid from the surface of a body of water as set forth in claim 1 which includes,
    maintaining said layer of combustible liquid on said band of water in a relatively quiescent state while moving said band rearwardly in said channel portion of said vessel.

3. A method for removing a layer of combustible liquid from the surface of a body of water as set forth in claim 1 which includes,
    removing said cellular ceramic nodules from said band of water after said layer of combustible liquid has been removed therefrom.

4. A method for removing a layer of combustible liquid from the surface of a body of water as set forth in claim 1 which includes,
    continuously advancing said vessel into said body of water having said layer of combustible liquid floating thereon at a preselected speed to remove said layer of combustible liquid from said band of water as said band of water moves rearwardly in said channel portion of said vessel.

5. A method for removing a layer of combustible liquid from the surface of a body of water as set forth in claim 4 which includes,
    continuously positioning a layer of nodules on said layer of combustible liquid at a forward location within said vessel channel portion as said band of water moves rearwardly in said channel portion of said vessel.

6. A method for removing a layer of combustible liquid from the surface of a body of water as set forth in claim 4 which includes,
    removing said cellular ceramic nodules from said band of water adjacent the rear portion of said vessel channel portion after said layer of combustible liquid has been removed therefrom, and
    conveying said nodules removed from said band of water to said forward location of said channel portion for positioning on said layer of combustible liquid floating on said band and moving rearwardly in said channel portion of said vessel.

7. Apparatus for removing a layer of combustible liquid from a body of water comprising,
    a self-propelled vessel having a pair of spaced side portions with a longitudinal channel portion therebetween,
    said vessel having an open bottom portion beneath said channel portion and a front opening for said channel portion so that a band of water with a layer of combustible liquid floating thereon moves rearwardly in said channel portion as said vessel advances in said body of water,
    means to position a layer of cellular ceramic nodules on the layer of combustible liquid floating on said band of water at a forward location in said channel portion, and
    means to burn said layer of combustible liquid with said layer of cellular ceramic nodules positioned thereon at a location adjacent the rear portion of said vessel channel portion.

8. Apparatus for removing a layer of combustible liquid from a body of water as set forth in claim 7 which includes,
    an enclosure for the rear portion of said vessel channel portion forming a combustion chamber within in which said layer of combustible liquid with said layer of cellular ceramic nodules floating thereon is burned.

9. Apparatus for removing a layer of combustible liquid from a body of water as set forth in claim 8 which includes,
    means to remove said cellular ceramic nodules in said layer adjacent the rear portion of said combustion chamber.

10. Apparatus for removing a layer of combustible liquid from a body of water as set forth in claim 9 which includes,
    means to convey said cellular ceramic nodules removed from said layer adjacent said combustion chamber rear portion to a forward portion in said vessel channel portion.

* * * * *